(12) United States Patent
Kao et al.

(10) Patent No.: US 7,978,927 B2
(45) Date of Patent: Jul. 12, 2011

(54) IMAGE PROCESSING APPARATUS

(75) Inventors: Hsu-Pin Kao, Pingjhen (TW); Yi-Chia Shan, Jhongli (TW); Hsu-Chia Kao, Pingjhen (TW); Kai-Chiang Hsu, Tucheng (TW)

(73) Assignee: Marketech International Corp., Taipei (TW)

( * ) Notice: Subject to any disclaimer, the term of this patent is extended or adjusted under 35 U.S.C. 154(b) by 797 days.

(21) Appl. No.: 12/043,671

(22) Filed: Mar. 6, 2008

(65) Prior Publication Data
US 2008/0219551 A1 Sep. 11, 2008

(30) Foreign Application Priority Data

Mar. 7, 2007 (TW) .............................. 96107780 A

(51) Int. Cl.
G06K 9/40 (2006.01)
G06K 9/00 (2006.01)

(52) U.S. Cl. ........ 382/274; 382/272; 382/273; 382/167; 382/168

(58) Field of Classification Search .......... 382/272–274, 382/167–168
See application file for complete search history.

(56) References Cited

U.S. PATENT DOCUMENTS

| 6,664,973 | B1 * | 12/2003 | Iwamoto et al. | 345/589 |
|---|---|---|---|---|
| 7,050,074 | B1 * | 5/2006 | Koyama | 345/690 |
| 7,349,574 | B1 * | 3/2008 | Sodini et al. | 382/168 |
| 7,446,779 | B2 * | 11/2008 | Ikeda et al. | 345/589 |
| 7,545,539 | B2 * | 6/2009 | Kao et al. | 358/3.21 |
| 7,561,189 | B2 * | 7/2009 | Chien et al. | 348/222.1 |
| 7,587,089 | B2 * | 9/2009 | Lin et al. | 382/205 |
| 2006/0221201 | A1 * | 10/2006 | Chien et al. | 348/222.1 |
| 2006/0221202 | A1 * | 10/2006 | Lin et al. | 348/222.1 |
| 2007/0065008 | A1 * | 3/2007 | Kao et al. | 382/169 |
| 2007/0075928 | A1 * | 4/2007 | Takeuchi et al. | 345/63 |
| 2007/0222711 | A1 * | 9/2007 | Kao et al. | 345/63 |
| 2007/0222730 | A1 * | 9/2007 | Kao et al. | 345/89 |
| 2008/0219551 | A1 * | 9/2008 | Kao et al. | 382/167 |
| 2010/0134689 | A1 * | 6/2010 | Flores et al. | 348/672 |

* cited by examiner

Primary Examiner — Bhavesh M Mehta
Assistant Examiner — Gandhi Thirugnanam
(74) Attorney, Agent, or Firm — Bacon & Thomas, PLLC

(57) ABSTRACT

The invention discloses an image processing apparatus for adjusting lightness of an input image. The image processing apparatus includes a first processing module, a second processing module, a third processing module, and a fourth processing module. The first processing module is used for generating a lightness histogram with reference to the input image and determining a maximum lightness and an average lightness according to the lightness histogram. The second processing module is used for determining a first gain and a second gain according to the maximum lightness and a look-up table. The third processing module is used for selecting a lightness adjusting curve according to the average lightness. The fourth processing module is used for generating an output lightness corresponding to the input image.

10 Claims, 5 Drawing Sheets

| L | GA | GB |
|---|---|---|
| $L_{00}$ | $GA_{00}$ | $GB_{00}$ |
| $L_{01}$ | $GA_{01}$ | $GB_{01}$ |
| $L_{02}$ | $GA_{02}$ | $GB_{02}$ |
| $L_{03}$ | $GA_{03}$ | $GB_{03}$ |
| ⋮ | ⋮ | ⋮ |
| $L_n$ | $GA_n$ | $GB_n$ |

LUT2

| L | GC |
|---|---|
| $L_{00}$ | $GC_{00}$ |
| $L_{01}$ | $GC_{01}$ |
| $L_{02}$ | $GC_{02}$ |
| $L_{03}$ | $GC_{03}$ |
| ⋮ | ⋮ |
| $L_n$ | $GC_n$ |

FIG. 4

IMAGE PROCESSING APPARATUS

BACKGROUND OF THE INVENTION

1. Field of the Invention

This invention relates to an image processing apparatus and, more particularly, to an image processing apparatus for adjusting the lightness of an input image.

2. Description of the Prior Art

In general, the image contrast refers to the lightness ratio between a light zone and a dark zone within an image. Enhancing the contrast of an image sometimes makes the image distorted a little. But, for most of people, adequately enhancing the image contrast will derive a desirable image.

Most of displays can offer users to adjust the image contrast or provide the Gamma factor for users to select, so as to improve the image contrast. But the constant image contrasts are usually unavailable to different images. For example, for the image whose whole lightness is much higher, users can select a larger Gamma factor or change the image contrast to enhance the contrast of the image. But the same image contrasts applied to the image whose lightness is lower may cause the dark portion of the image to lose the niceties, so as to make the quality of the image worse.

Accordingly, the major scope of the inventor is to provide an image processing apparatus to solve the foregoing problems.

SUMMARY OF THE INVENTION

A scope of the invention is to provide an image processing apparatus for adjusting the lightness of an input image to improve the contrast of the image.

According to a preferred embodiment, the image processing apparatus of the invention is for adjusting the lightness of an input image. The image processing apparatus includes a first processing module, a second processing module, a third processing module, and a fourth processing module.

The first processing module is for generating a lightness histogram with reference to the input image and determining a maximum lightness and an average lightness according to the lightness histogram.

The second processing module, coupled to the first processing module, comprises a first memory unit for storing a first look-up table. The second processing module is used for determining a first gain and a second gain according to the maximum lightness and the first look-up table.

The third processing module, coupled to the first processing module, comprises a second memory unit for storing a plurality of lightness adjusting curves. The third processing module is used for selecting one of the lightness adjusting curves according to the average lightness.

The fourth processing module, respectively coupled to the second processing module and the third processing module, comprises a processing unit, a first multiplier, a second multiplier, and a third multiplier. The first multiplier is for multiplying the lightness of the input image by the first gain to generate a first temporary lightness. The processing unit is for determining a third gain according to the first temporary lightness and the selected lightness adjusting curve. The second multiplier is for multiplying the first temporary lightness by the third gain to generate a second temporary lightness. The third multiplier is for multiplying the second temporary lightness by the second gain to generate an output lightness corresponding to the input image.

Accordingly, the image processing apparatus of the invention can dynamically adjust the lightness of the input images according to the input images which have different contents to improve the contrast of the image.

The advantage and spirit of the invention may be understood by the following recitations together with the appended drawings.

BRIEF DESCRIPTION OF THE APPENDED DRAWINGS

FIG. 4 is a schematic diagram illustrating the second look-up table transformed from the lightness adjusting curves in FIG. 3.

DETAILED DESCRIPTION OF THE INVENTION

Figure 1:
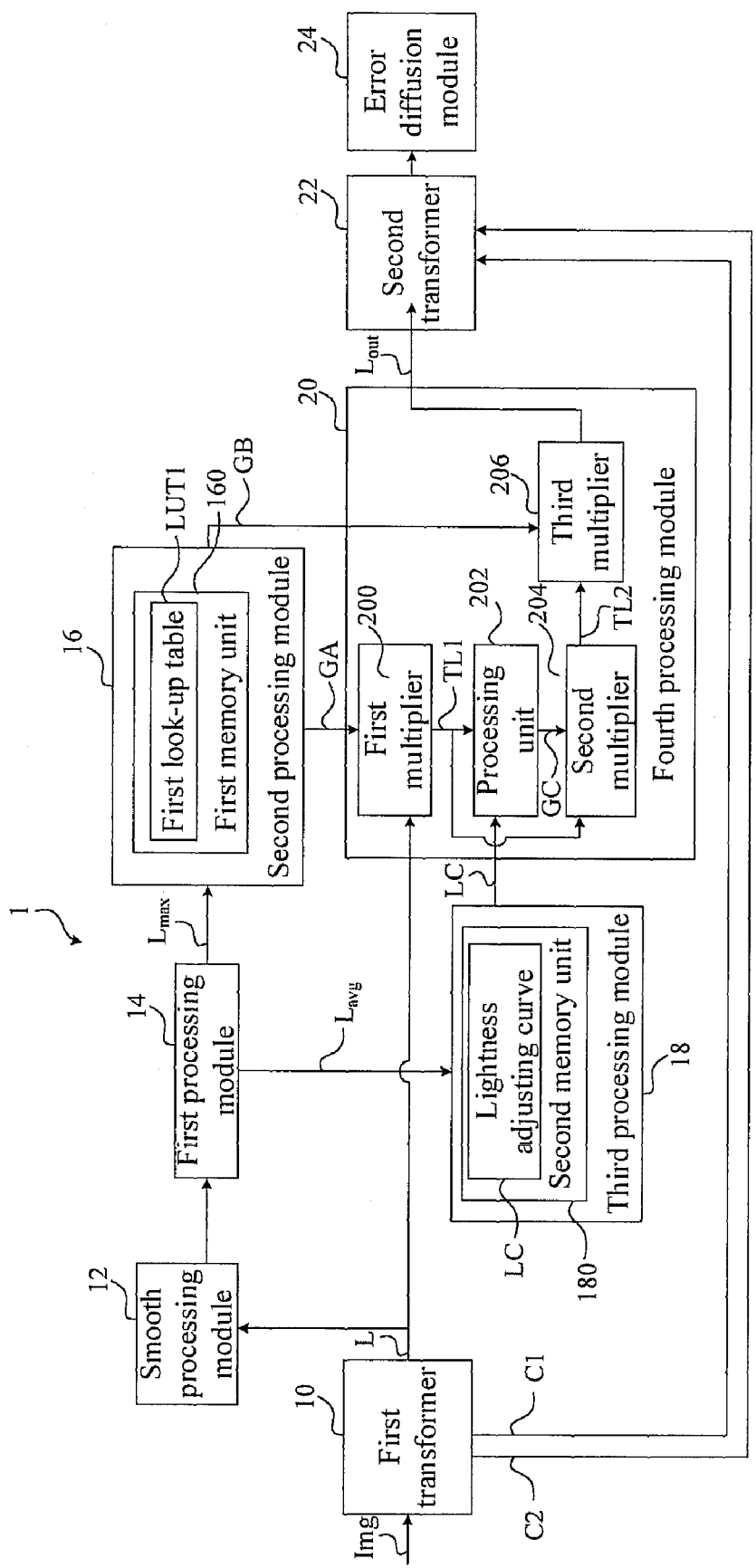
FIG. 1 is a function block diagram illustrating the image processing apparatus according to a preferred embodiment of the invention.

Please refer to FIG. 1 which is a function block diagram illustrating the image processing apparatus 1 according to a preferred embodiment of the invention. In the embodiment, the image processing apparatus 1 is for adjusting the lightness L of an input image Img to improve the contrast of the input image Img.

As shown in FIG. 1, the image processing apparatus 1 includes a first transformer 10, a smooth processing module 12, a first processing module 14, a second processing module 16, a third processing module 18, a fourth processing module 20, a second transformer 22, and an error diffusion module 24. The first transformer 10 is respectively coupled to the smooth processing module 12 and the fourth processing module 20. The second processing module 16 and the third processing module 18 are respectively coupled to the first processing module 14. The fourth processing module 20 is respectively coupled to the second processing module 16 and the third processing module 18. The second transformer 22 is respectively coupled to the first transformer 10 and the fourth processing module 20. The error diffusion module 24 is coupled to the second transformer 22.

The second processing module 16 further includes a first memory unit 160 for storing a first look-up table LUT1. The third processing module 18 further includes second memory unit 180 for storing a plurality of lightness adjusting curves LC. The fourth processing module 20 further includes a first multiplier 200, a processing unit 202, a second multiplier 204, and a third multiplier 206.

Figure 2:
FIG. 2 is a schematic diagram illustrating the first look-up table in FIG. 1.

Please refer to FIG. 2 which is a schematic diagram illustrating the first look-up table LUT1 in FIG. 1. As shown in FIG. 2, the first look-up table LUT1 records a plurality of lightness values L, a plurality of first gains GA, and a plurality of second gains GB, and each of the lightness values L is respectively corresponding to one of the first gains GA and one of the second gains GB.

Figure 3:
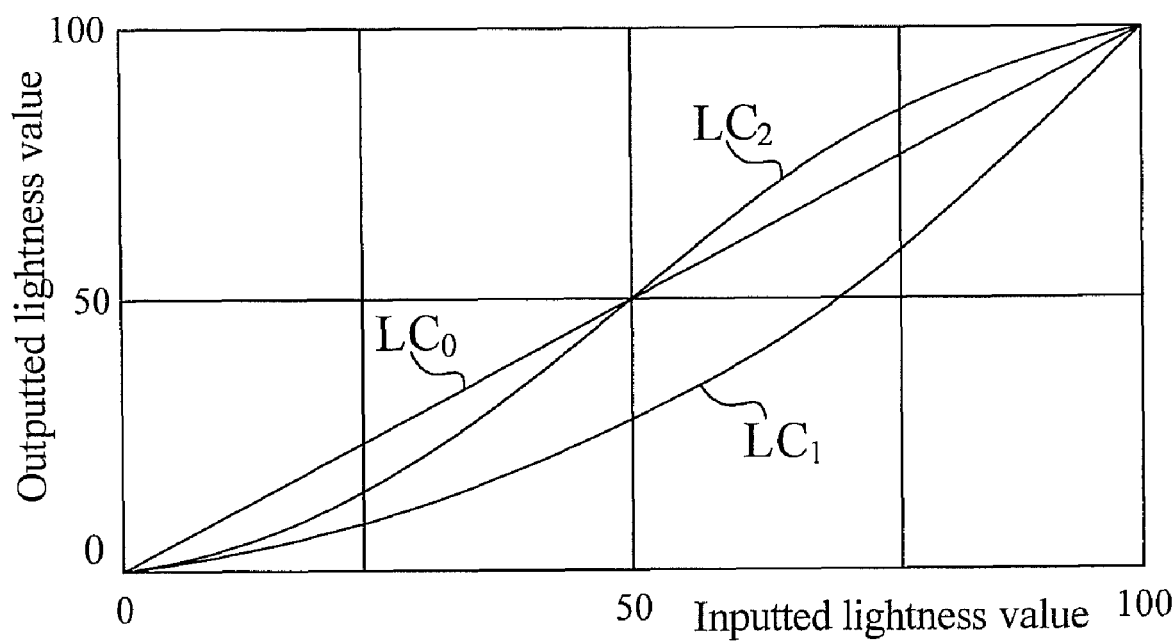
FIG. 3 is a schematic diagram illustrating the lightness adjusting curves in FIG. 1.

Please refer to FIG. 3 and FIG. 4. FIG. 3 is a schematic diagram illustrating the lightness adjusting curves LC in FIG. 1, and FIG. 4 is a schematic diagram illustrating the second look-up table LUT2 transformed from the lightness adjusting curves LC in FIG. 3. In the embodiment, the lightness adjusting curves LC are for adjusting the lightness L of the input image Img to change the contrast of the input image Img, and as shown in FIG. 3, wherein the x-coordinate and the y-coordinate respectively represent the inputted lightness and the outputted lightness. For example, a lightness adjusting curve $LC_0$ can be a line whose slope is 1 that represents the lightness does not adjusted; a lightness adjusting curve $LC_1$ can be a Gamma curve that is for adjusting the input image Img whose whole lightness is much higher; a lightness adjusting curve $LC_2$ can be an inverse curve that can make the bright portion of the input image Img brighter and the dark portion of the input image Img darker, and the amplitude of the lightness adjusting curve $LC_2$ can be adjusted to apply to the input image Img with medium lightness or lower lightness. In the practical application, the fourth processing 20 is capable of transforming the selected lightness adjusting curve LC into a second look-up table LUT2, and as shown in FIG. 4, wherein the second look-up table LUT2 records a plurality of lightness values L and a plurality of third gains GC, and each of the lightness values L is respectively corresponding to one of the third gains GC.

It is notable that the foregoing first look-up table LUT1 and the lightness adjusting curve LC have different settings according to different practical applications.

In the foregoing embodiment, the input image ling conforms to RGB color space (a first color space). Referring to FIG. 1, the first transformer 10 is used for transforming the input image Img from RGB color space into a second color space which the lightness and the color are separated, wherein the second color space is one selected from a group consisting of YCbCr color space, Yuv color space, YIQ color space, CIELab color space, and Luv color space and defines a lightness element L and color element C1, C2. Furthermore, only the input image Img must meet the condition that the gray levels and the lightness of red, blue, and green are linear, the input image Img can be transformed from RGB color space to Lab color space. Accordingly, the input image Img must be applied a Gamma transformation. The Gamma transformation is a prior art, so it is not to be discussed here.

In the embodiment, the smooth processing module 12 is for performing smooth process on the input image Img by using a mask (such as [1 2 1]/4, [1 2 2 2 1]/8, and etc.). The purpose of performing smooth process is to avoid deriving noise that causes the error of an image to increase while making the lightness histogram. The smooth process is a prior art, so it is not to be discussed here. It is notable that the smooth processing module 12 only performs smooth process on input image Img which is transformed to the first processing module 14, not the input image Img which is transformed to the fourth processing module 20. Accordingly, the definition of the image will not be influenced.

Figure 5:
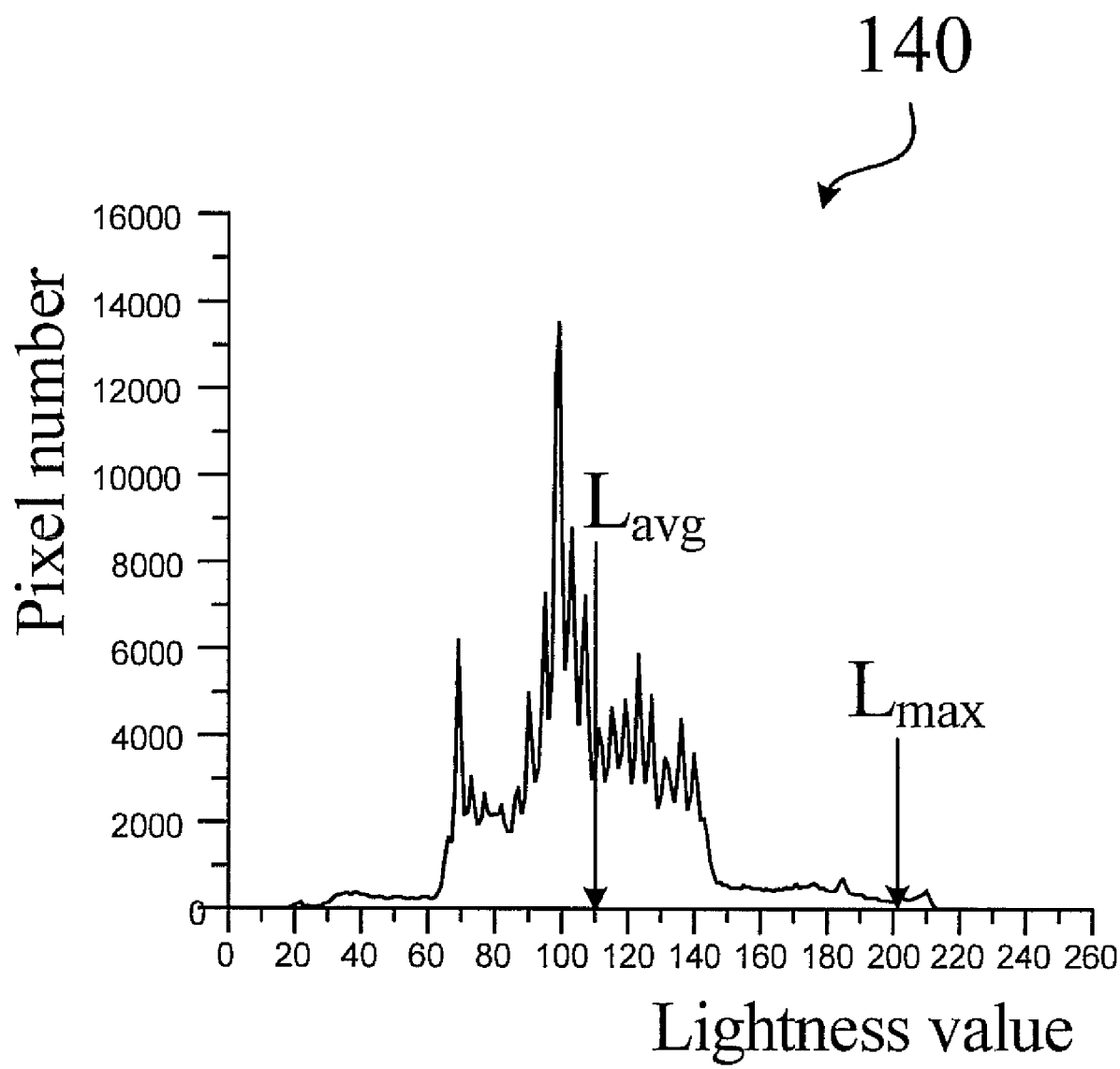
FIG. 5 is a schematic diagram illustrating the lightness histogram generated by the first processing module in FIG. 1.

Please refer to FIG. 5 which is a schematic diagram illustrating the lightness histogram 140 generated by the first processing module 14 in FIG. 1. As shown in FIG. 1 and FIG. 5, in the embodiment, the first processing module 14 is for generating the lightness histogram 140 with reference to the input image Img and determining a maximum lightness $L_{max}$ and an average lightness $L_{avg}$ according to the lightness histogram. The lightness histogram 140 is generated by calculating the lightness of all pixels of the input image Img. In the practical application, $L_{max}$ can be defined as the lightness corresponding to the right 0.5% area of the lightness histogram 140, but does not limited by this; $L_{avg}$ can be defined as the lightness corresponding to the gravity of the area of the lightness histogram 140, but does not limited by this. Furthermore, the lightness histogram 140 also can be generated by calculating the lightness of the sampling pixels of the input image Img. Accordingly, hardware resource can be saved.

Referring to FIG. 1, the second processing module is used for determining the first gain GA and the second gain GB according to the maximum lightness $L_{max}$ and the first look-up table LUT1. In the embodiment, the first gain GA can be set larger than or equal to 1, and the second gain GB can be set smaller than or equal to 1.

In the practical application, the second processing module 16 can further average the first gain GA derived from the input image Img and the gain that derived from the preceding K−1 input image to derive a new first gain GA, and K is a natural number. The way to calculate the second gain GB is the same as that of the first gain GA, so it will not be discussed here. Accordingly, the input image Img which is adjusted by the image processing apparatus 1 can avoid glittering. Moreover, when the difference of the first gain GA derived from the input image Img and the preceding one that derived from the preceding one input image is larger than a threshold value, the first gain GA will not be averaged, and the first gain derived from the preceding K−1 input image is set as GA, wherein the threshold value can be designed by a designer according to practical applications. The determining way of the second gain GB is the same as that of the first gain GA, so it will not be discussed. Accordingly, it can avoid making the image getting brighter or darker when there is a big variation of the lightness between the adjacent input images.

Referring to FIG. 1, the third processing module 18 is used for selecting one of the lightness adjusting curves LC according to the average lightness $L_{avg}$.

The first multiplier 200 within the fourth processing module 20 is for multiplying the lightness of the input image Img by the first gain GA to generate a first temporary lightness TL1. The processing unit 202 is for determining a third gain GC according to the first temporary lightness TL1 and the selected lightness adjusting curve LC. In the practical application, the processing unit 202 can determine the third gain GC according to the first temporary lightness TL1 and the second look-up table LUT2. The second multiplier 204 is for multiplying the first temporary lightness TL1 by the third gain GC to generate a second temporary lightness TL2. The third multiplier 206 is for multiplying the second temporary lightness TL2 by the second gain GB to generate an output lightness $L_{out}$ corresponding to the input image Img. Accordingly, the lightness of the input image Img can be dynamically adjusted to the output lightness $L_{out}$ by the image processing apparatus 1, so as to improve the contrast of the input image Img.

Then, the second transformer 22 transforms the input image from the second color space (such as Lab color space) to the first color space (such as RGB color space).

In the practical application, the image processing apparatus 1 can further error-diffuse the input image by the error diffusion module 24. The error-diffusing process is a prior art, so it is not to be discussed here.

Compared with prior arts, the image processing apparatus according to the invention improves the contrast of the input image by adjusting the lightness of the image. Moreover, the image processing apparatus of the invention dynamically selects the lightness adjusting curves for adjusting the lightness of the image in accordance with the input images with different lightness. Accordingly, the input images with different lightness can be properly adjusted, and the contrast of the image can be improved to gain the quality of the image.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An image processing apparatus for adjusting lightness of an input image, comprising:
   a first processing module for generating a lightness histogram with reference to the input image and determining a maximum lightness and an average lightness according to the lightness histogram;
   a second processing module, coupled to the first processing module, comprising a first memory unit for storing a first look-up table, the second processing module being used for determining a first gain and a second gain according to the maximum lightness and the first look-up table;
   a third processing module, coupled to the first processing module, comprising a second memory unit for storing a plurality of lightness adjusting curves, the third processing module being used for selecting one of the lightness adjusting curves according to the average lightness; and
   a fourth processing module, respectively coupled to the second processing module and the third processing module, comprising:
      a first multiplier for multiplying the lightness of the input image by the first gain to generate a first temporary lightness;
      a processing unit for determining a third gain according to the first temporary lightness and the selected lightness adjusting curve;
      a second multiplier for multiplying the first temporary lightness by the third gain to generate a second temporary lightness; and
      a third multiplier for multiplying the second temporary lightness by the second gain to generate an output lightness corresponding to the input image.

2. The image processing apparatus of claim 1, further comprising a smooth processing module, coupled to the first processing module, for performing smooth process on the input image by using a mask.

3. The image processing apparatus of claim 1, wherein the first look-up table records a plurality of lightness values, a plurality of first gains, and a plurality of second gains, each of the lightness values is respectively corresponding to one of the first gains and one of the second gains.

4. The image processing apparatus of claim 1, wherein the first gain is larger than or equal to 1, and the second gain is smaller than or equal to 1.

5. The image processing apparatus of claim 1, wherein the plurality of lightness adjusting curves are Gamma curves.

6. The image processing apparatus of claim 1, wherein the fourth processing module is capable of transforming the selected lightness adjusting curve into a second look-up table, the second look-up table records a plurality of lightness values and a plurality of third gains, each of the lightless values is respectively corresponding to one of the third gains.

7. The image processing apparatus of claim 1, further comprising a first transformer, respectively coupled to the first processing module and the fourth processing module, the input image complying with a first color space, the first transformer being used for transforming the input image from the first color space into a second color space.

8. The image processing apparatus of claim 7, further comprising a second transformer, respectively coupled to the first transformer and the fourth processing module, for transforming the input image from the second color space into the first color space.

9. The image processing apparatus of claim 8, further comprising an error diffusion module, coupled to the second transformer, for error-diffusing the input image.

10. The image processing apparatus of claim 7, wherein the first color space is RGB color space, and the second color space is one selected from a group consisting of YCbCr color space, Yuv color space, YIQ color space, CIELab color space, and Luv color space.

* * * * *